SPEER & HARLOW.
Fruit Drier.
No. 40,646. Patented Nov. 17, 1863.
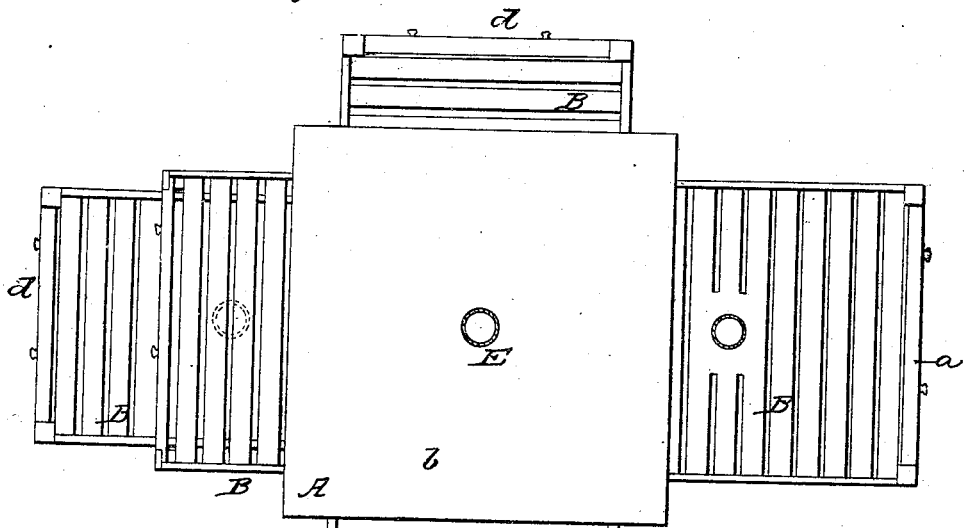
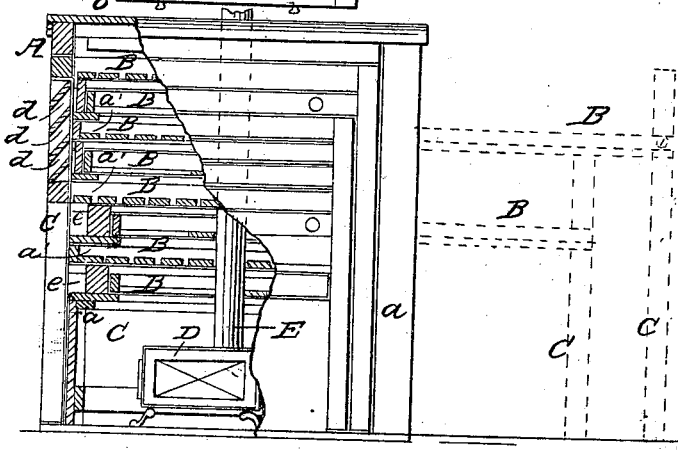

UNITED STATES PATENT OFFICE.

HENRY SPEER AND JOHN L. HARLOW, OF CHELSEA, MICHIGAN.

IMPROVEMENT IN FRUIT-DRIERS.

Specification forming part of Letters Patent No. 40,646, dated November 17, 1863.

*To all whom it may concern:*

Be it known that we, HENRY SPEER and JOHN L. HARLOW, both of Chelsea, in the county of Washtenaw and State of Michigan, have invented a new and Improved Fruit Kiln and Drier; and we do hereby declare that the following is a full, clear, and exact description of the same, reference being had to the accompanying drawings, forming part of this specification, in which—

Figure 1 represents a plan or top view of our invention. Fig. 2 is a vertical central section of the same.

Similar letters of reference in both views indicate corresponding parts.

The object of this invention is to produce a fruit-drier which combines in a simple and convenient manner the two methods of kiln-drying and open-air drying, so that the fruit can be exposed to the sun or open air, or to the artificial heat of a stove simply by drawing out or pushing in a series of trays or racks, as circumstances may require.

The nature of our invention and its advantages will be readily understood from the following description.

A represents a portable house or hut, composed of four (more or less) posts, or covered with a convex roof, $b$, and connected by slats $a'$. The space between the posts $a$ and slats $a'$ are occupied by a series of trays, B, which slide in and out, and each of which is provided with two legs, $c$, which support the same when it is drawn out, as shown in red outlines in Fig. 2. The bottoms of the several trays are perforated or slotted to admit of a free circulation of heat and air, and the legs $c$ extend above the bottoms and form the supports for a series of slats, $d$, which are set in an inclined position, similar to Venetian blinds, as clearly shown in Fig. 2. Through these blinds air is admitted to the interior of the house when the trays are in, and the circulation of the air is further facilitated by recesses $e$ under the front cross-bars of the trays, whereby the external air is allowed to pass up through the perforated bottoms and to come in contact with and circulate over the fruit or other articles spread on the trays. The lower portion of the house A is inclosed by boards or other suitable material, forming a stove-chamber, C, in which is placed a stove, D, and from this stove rises a pipe, E, through holes in the centers of the several trays and through a suitable thimble in the roof. When the trays are all in, this pipe can be introduced through the roof and connected in the proper position with the stove, and by lighting a fire in said stove all the fruit or other articles contained on the trays can be heated simultaneously and with a comparatively trifling expenditure of fuel. The heat circulates readily and freely through the openings in the trays and a free ventilation is afforded by the peculiar construction of the kiln. In fair weather the trays or racks can be drawn out so as to expose their combined area to the action of the sun and air, and in case of a sudden storm said trays can be readily run in and the pipe adjusted in a few minutes, thereby protecting the fruit from the storm, and at the same time a fire can be built and the process of drying continued without interruption. Furthermore, by inserting the pipe the trays are firmly held in place, so that they cannot be upset by accident, and if the pipe is fastened on the inside the trays cannot be withdrawn, and the fruit is protected against pilferers or thieves.

What we claim as new, and desire to secure by Letters Patent, is—

1. The trays or racks B, when the same are provided with perforated bottoms and with blinds $d$ and legs $c$, and arranged in relation to each other and to the house A as shown and described.

2. The recesses $e$ in the house A, in combination with the perforated bottoms of the trays and with the blinds $d$, as and for the purpose specified.

3. The pipe E, arranged in combination with the trays B and stove D, substantially in the manner and for the purpose set forth.

HENRY SPEER.
JOHN L. HARLOW.

Witnesses:
CHARLES H. REMPF,
WM. P. MACOMBER.